United States Patent
Chen

(10) Patent No.: US 10,063,063 B2
(45) Date of Patent: Aug. 28, 2018

(54) HARMONIC HARVESTER FOR IMPROVED RF-TO-DC RECTIFYING EFFICIENCY

(71) Applicant: OHIO STATE INNOVATION FOUNDATION, Columbus, OH (US)

(72) Inventor: Chi-Chih Chen, Dublin, OH (US)

(*) Notice: Subject to any disclaimer, the term of this patent is extended or adjusted under 35 U.S.C. 154(b) by 32 days.

(21) Appl. No.: 15/103,557

(22) PCT Filed: Dec. 12, 2014

(86) PCT No.: PCT/US2014/070087
§ 371 (c)(1),
(2) Date: Jun. 10, 2016

(87) PCT Pub. No.: WO2015/089437
PCT Pub. Date: Jun. 18, 2015

(65) Prior Publication Data
US 2016/0315478 A1  Oct. 27, 2016

Related U.S. Application Data

(60) Provisional application No. 61/915,237, filed on Dec. 12, 2013.

(51) Int. Cl.
*H02J 5/00* (2016.01)
*H02M 7/06* (2006.01)
*H02M 1/12* (2006.01)
*H02M 1/00* (2006.01)

(52) U.S. Cl.
CPC .............. *H02J 5/00* (2013.01); *H02M 7/06* (2013.01); *H02M 1/12* (2013.01); *H02M 7/066* (2013.01); *H02M 2001/0048* (2013.01); *Y02B 70/1491* (2013.01)

(58) Field of Classification Search
CPC .. H02M 1/12; H02M 7/006; H02M 2001/048; H02M 7/066
See application file for complete search history.

(56) References Cited

U.S. PATENT DOCUMENTS

| | | |
|---|---|---|
| 5,671,133 A | 9/1997 | Fujita et al. |
| 2006/0164866 A1 | 7/2006 | Vanderelli et al. |
| 2009/0134952 A1 | 5/2009 | Smith |
| 2009/0152954 A1 | 6/2009 | Le et al. |
| 2010/0190435 A1 | 7/2010 | Cook et al. |
| 2011/0298296 A1 | 12/2011 | Hwang |
| 2012/0236606 A1 | 9/2012 | Mazzoli |
| 2012/0313728 A1 | 12/2012 | Cairo |
| 2013/0077360 A1 | 3/2013 | Low et al. |

FOREIGN PATENT DOCUMENTS

JP 2002233083 A 8/2002

OTHER PUBLICATIONS

Written Opinion for PCT application PCT/US2014/070087 dated Mar. 9, 2015, 10 pages.

*Primary Examiner* — Robert Deberadinis
(74) *Attorney, Agent, or Firm* — Benesch, Friedlander, Coplan & Aronoff LLP

(57) ABSTRACT

A harmonic harvesting circuit design for harvesting un-rectified AC power contained in the fundamental and harmonic frequencies at the output of conventional rectifying circuits.

23 Claims, 10 Drawing Sheets

PRIOR ART

HARMONIC HARVESTER FOR IMPROVED RF-TO-DC RECTIFYING EFFICIENCY

CROSS-REFERENCE TO RELATED APPLICATIONS

This application claims priority to U.S. Provisional Application No. 61/915,237, filed Dec. 12, 2013, which is hereby incorporated by reference in its entirety.

BACKGROUND AND SUMMARY OF THE INVENTION

Conventional rectifying circuit design converts alternating-current (AC) signals into a direct-current (DC) signal. Low-barrier Schottky diodes are often used in low AC power cases such as ambient RF signals. The AC-to-DC conversion bandwidth and efficiency are related to AC power level, diode characteristics, and load impedance. The diode characteristics also depend on frequency, input power level, and output current.

Since all diodes are not ideal with non-zero threshold voltage and non-linear I-V characteristics, the output of a rectifying circuit contains many harmonic signals in addition to the desired DC signal. Exemplary embodiments of the present invention relate generally to a novel harmonic harvesting circuit design for harvesting un-rectified AC power (contained in the fundamental and harmonic frequencies) at the output of conventional rectifying circuits. It is appreciated that the present invention can also be used with other types of conventional AC-to-DC converter circuits that have similar problems as the conventional rectifying circuits. As a result, this invention can improve rectifying efficiency as well as extend the upper frequency limit of conventional rectifying circuits, and thus enabling efficient energy harvesting from radio frequency (RF) signals at higher frequencies used for GSM (Global System for Mobile Communications) or Wi-Fi from 700 MHz to 2500 MHz.

One of the most important components in RF energy harvesting is a rectifier which converts RF signals into DC power. Low-barrier Schottky diodes are often used as switches in low-power, high-frequency rectifier circuitry due to their low turn-on voltage, small resistance, and small junction capacitance. However, typical conversion efficiency of ambient RF harvesters are less than 60% due to ohmic loss in diode resistance and un-rectified energy in the harmonics produced by the diode's non-linear I-V property and the rectifying process. (Un-rectified signals/energy are AC signals/energy that are not converted into a DC signal/energy by the rectifying circuit. Other types of AC-to-DC converter circuits may also be used with the present invention.) Rectifying efficiency higher than 50% is very difficult to achieve at low RF input power level as in the case of most ambient RF signals, and can only be achieved under very optimal conditions of impedance matching, input power level, frequency, and load impedance. The output harmonics has been shown in the literature to contain as much as 20% of energy which is wasted in conventional rectifier designs.

In addition to being able to harvest the RF energy contained in the harmonics produced by the non-linear property of rectifying diodes, the novel circuitry of the present invention can also improve the rectifying efficiency at the upper frequency limit of the rectifying diode where some portion of the input RF signal bypass the diode through its junction capacitance. This produces un-rectified RF signals at the fundamental frequency at the output of conventional rectifiers. Such RF signals are shorted to the ground by the large DC hold capacitor, and thus being wasted.

Disclosed herein is an exemplary harmonic harvester circuit design which converts un-rectified signals at the output of conventional rectifier circuits. In an alternative embodiment, a harvester circuit of the present invention connects between the output and input of a conventional rectifier circuit, thus forming a feedback loop circuitry. Additional embodiments of variations of harvester circuit topologies are comprised of different arrangement of rectifying diodes, filters, and impedance matching circuits.

In addition to the novel features and advantages mentioned above, other benefits will be readily apparent from the following descriptions of the drawings and exemplary embodiments.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Exemplary embodiments of the present invention are directed to improvements in RF to DC conversion efficiency, defined as the ratio of the final DC output power to the input RF power. All simulated results were obtained using the commercial Advanced Design System Circuit Design Cookbook Referring to FIG. 1, an exemplary embodiment of a standard Greinacher Voltage Doubler circuit commonly used to convert RF signals into DC power is shown. A single 2.45 GHz tone RF source at −10 dBm power level enters the circuit from the left. It is followed by an impedance matching circuit comprised of a single-stub tuner for minimizing reflection back into the source. The capacitor C1 is for blocking the DC signal from going to the RF source while allowing the RF signal from the source to pass through. Next are two rectifying diodes D1 and D2 that are the SMS7630 low-barrier Schottky diodes. The rectified output DC signal level is smoothed by the charge holding capacitor C2. The output is connected to a 1K resistor at the right hand side. Ideally, all RF energy should be converted into DC power and has a high conversion efficiency of almost 100%, except for some ohmic loss to the diode resistance. All diodes operating under low bias voltage conditions, as in the case of ambient RF energy harvesting, have non-linear I-V properties. This produces harmonic signals whose frequencies are multiple of the fundamental frequency. In addition, the finite junction capacitance across the diode's P-N junction allows a small portion of the input RF signal to leak to the output. The amount of leakage increases with frequency. Therefore, the output of a practical rectifying circuit, or "rectifier", contains more than just DC. This is demonstrated by FIG. 2 which shows the power spectrum observed at the output of the rectifier. It shows significant power present at the fundamental and harmonic frequencies based on the amount of DC power generated from the −10 dBm RF source, the conversion efficiency is approximately 24.8%.

Figure 1:
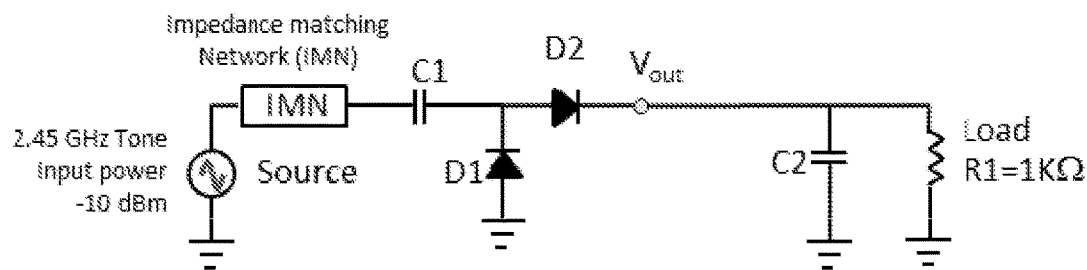
FIG. 1 is a standard Greinacher Voltage Doubler circuit with a single 2.45 GHz tone input.
Figure 2:
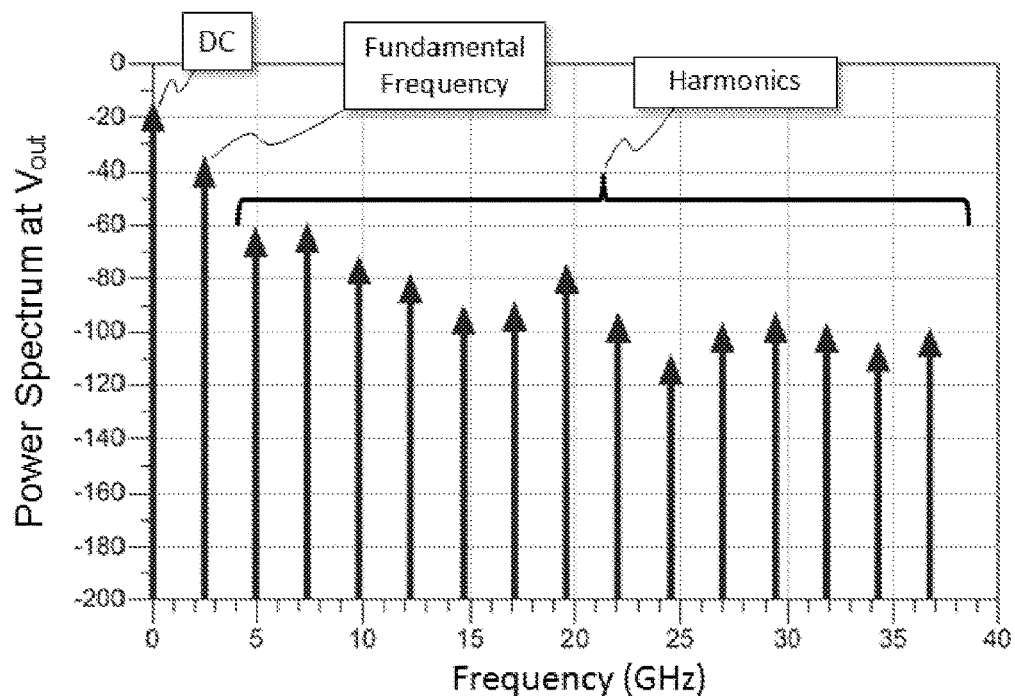
FIG. 2 is the output power spectrum of standard Greinacher Voltage Doubler circuit shown in FIG. 1.
Figure 3:
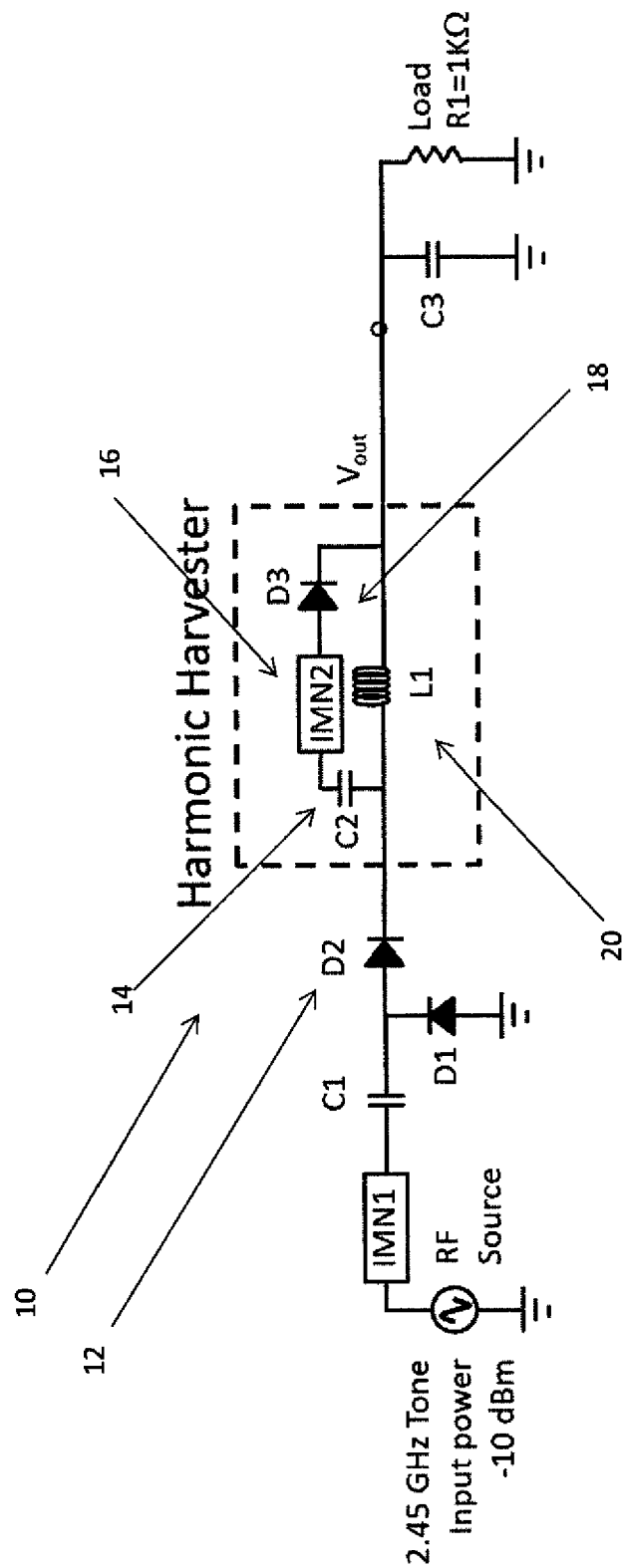
FIG. 3 is a Greinacher Voltage Doubler circuit with a Harmonic Harvester circuit block of the present invention added. The operating frequency is at 2.45 GHz.

FIG. 3 shows an exemplary embodiment of harmonic harvester 10 block added to the output of the conventional rectifier 12 shown in FIG. 1. The harmonic harvester circuit block in this exemplary embodiment is comprised of a DC blocking capacitor C2 14, followed by an impedance match network circuit 16 (IMN2), a rectifying diode D3 18, and a RF blocking inductor L1 20 for preventing fundamental and harmonic signals from getting shorted to the ground through C3.

In FIG. 3, the un-rectified RF energy present at the fundamental and harmonic frequencies at the output of D2 is stopped by the RF blocking inductor L1 and redirected to the harmonic harvester circuit that is comprised of the DC blocking capacitor C2, an impedance matching circuit IMN2 (which is preferably different from IMN1), and rectifying diode D3 (which in one embodiment is the same as D1 and D2, but it does not have to be the same).

Figure 4:
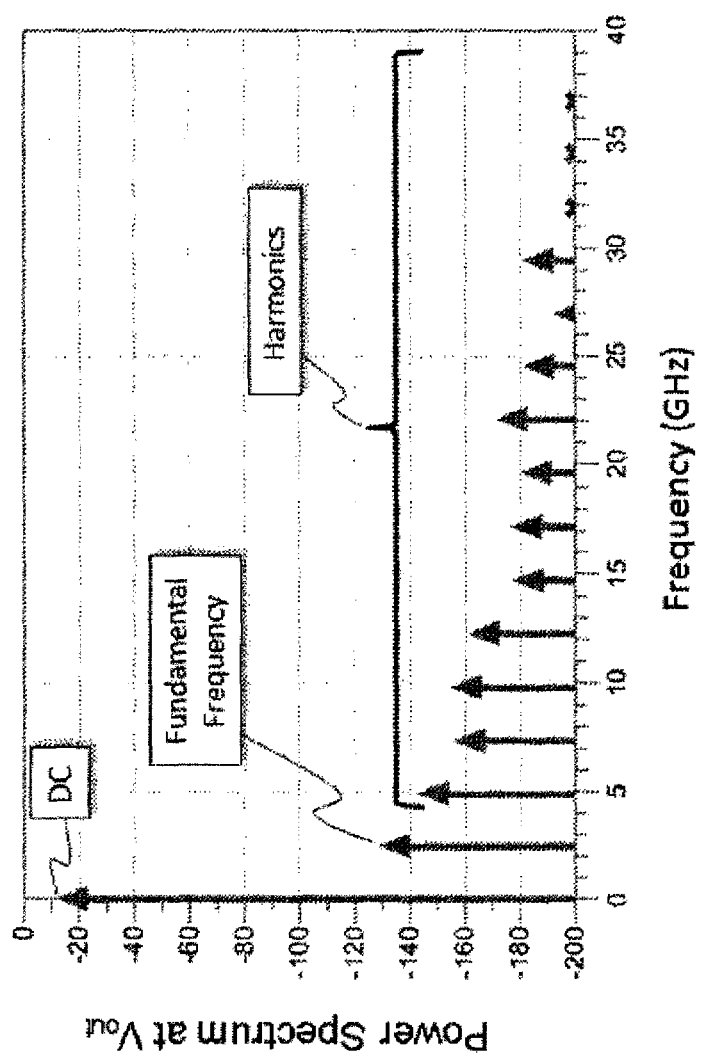
FIG. 4 is the output power spectrum of the Harmonic Harvester circuit block shown in FIG. 3.

The computed output power spectrum of FIG. 3 observed at $V_{out}$ shown in FIG. 4 shows that the power levels at fundamental and harmonic frequency have been significantly reduced by the harmonic harvester circuit. Some of this energy has been converted into DC by the harmonic harvester circuit block. This results in a conversion efficiency increase from 24.8% to 40%.

In an alternative embodiment, additional components could be added to provide a more sophisticated frequency control. For example instead of the single capacitor C2, a simple high-pass filter may be used; instead of a single inductor L, a simple low-pass filter may be used. These electrical circuit elements can also be replaced with more complicated L/C circuitry to achieve a more sophisticated filtering.

Figure 5:
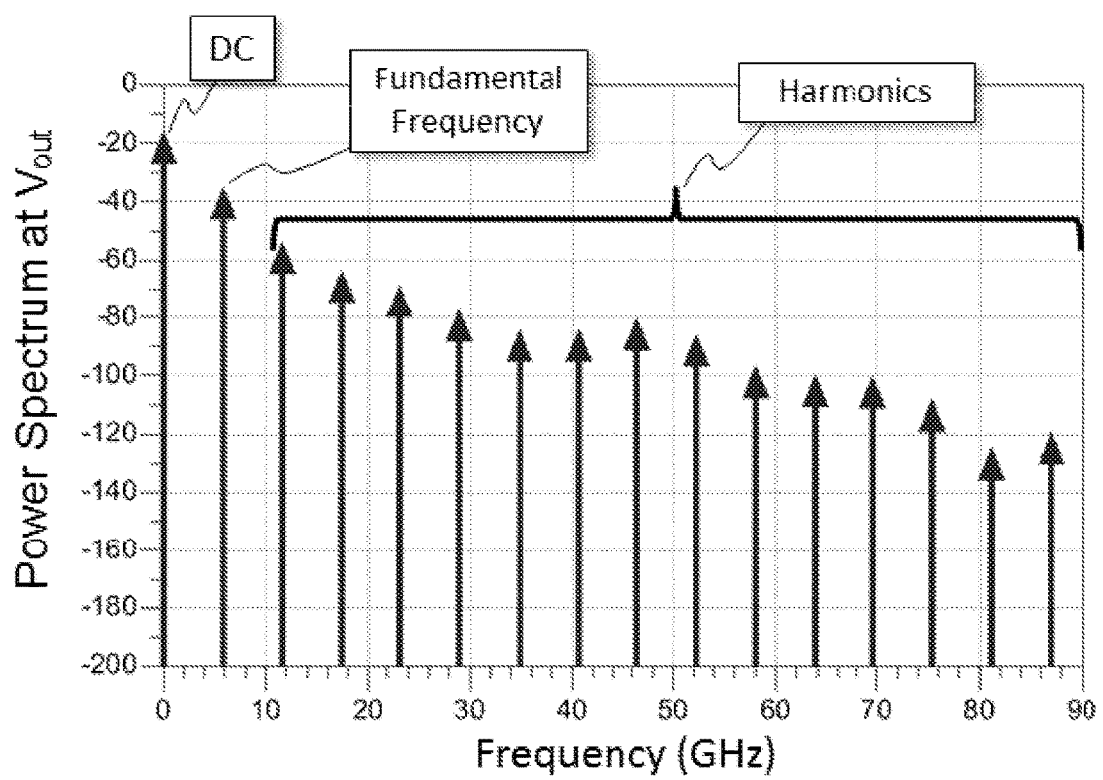
FIG. 5 is the output power spectrum of standard Greinacher Voltage Doubler circuit of an alternative embodiment using a 5.8 GHz input.

In an alternative embodiment to FIG. 1, the frequency of the input signal is increased from 2.45 GHz to 5.8 GHz to demonstrate reduced conversion efficiency due to more RF energy leaking through the junction capacitance of D1 and D2. Comparing the output DC power level in the FIG. 5 output power spectrum to that obtained in FIG. 2 at 2.45 GHz shows significant DC power reduction. The conversion efficiency in this case is 16%.

Figure 6:
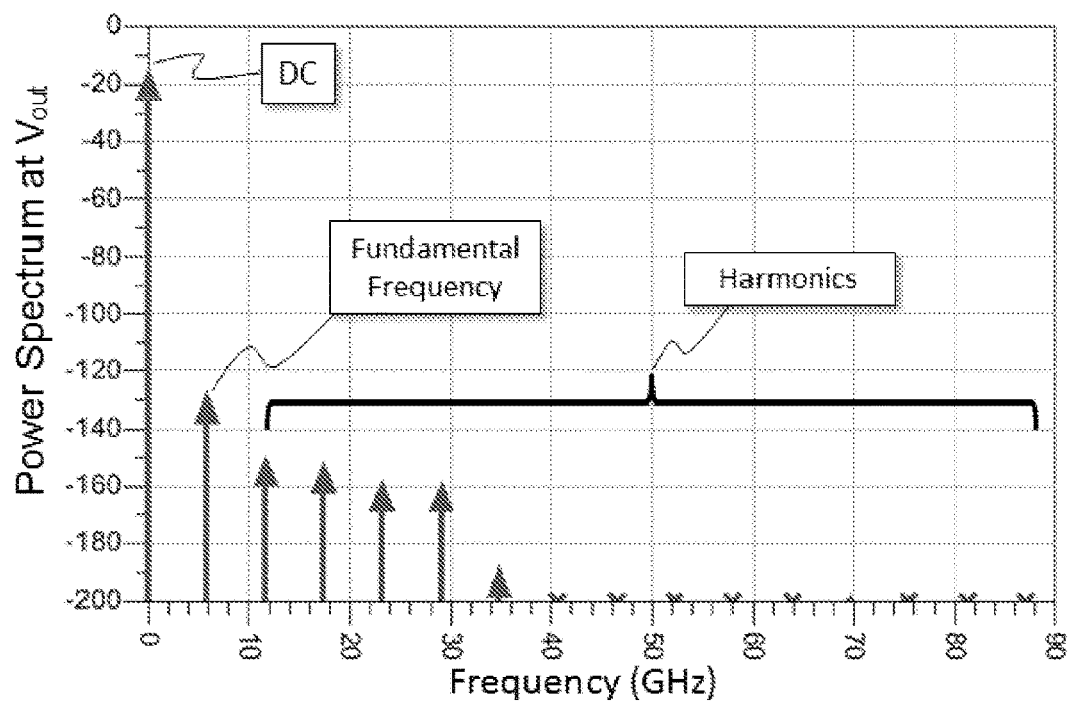
FIG. 6 is the output power spectrum of one Harmonic Harvester circuit of FIG. 3 using a 5.8 GHz input.

In an alternative embodiment to FIG. 3, the frequency of the input signal is increased from 2.45 GHz to 5.8 GHz. The output power spectrum in FIG. 6 shows that the DC power is increased compared to that in FIG. 5. The resultant conversion efficiency increases from 16% to 22%.

Figure 7:
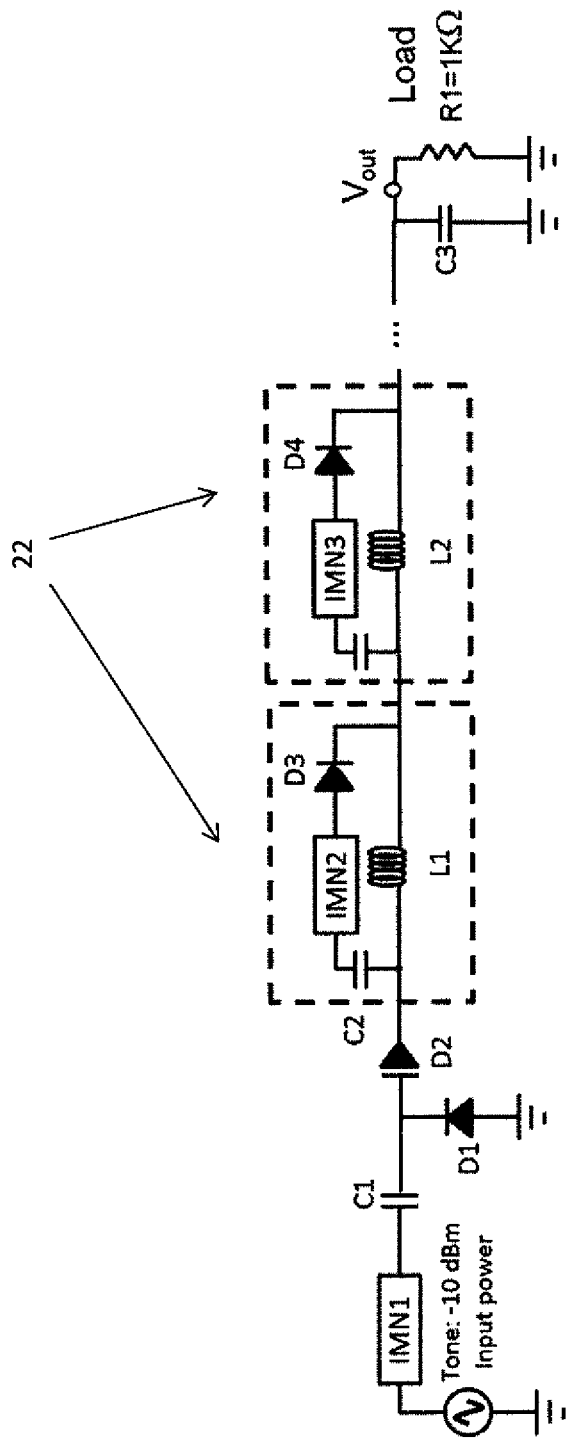
FIG. 7 shows an exemplary embodiment of the present invention connecting multiple harmonic harvesters in a cascade fashion. The operating frequency in this embodiment is at 5.8 GHz.

FIG. 7 shows an exemplary embodiment of the present invention of connecting multiple harmonic harvesters 22 in a cascade (series) fashion for harvesting more power into DC—especially in high-leakage situations as the output of each harmonic harvester could still have non-DC component. It is important to keep the number of the harmonic harvesters to a minimal since additional diodes in each harmonic harvester circuit also add more ohmic loss, and thus lowering conversion efficiency.

Figure 8:
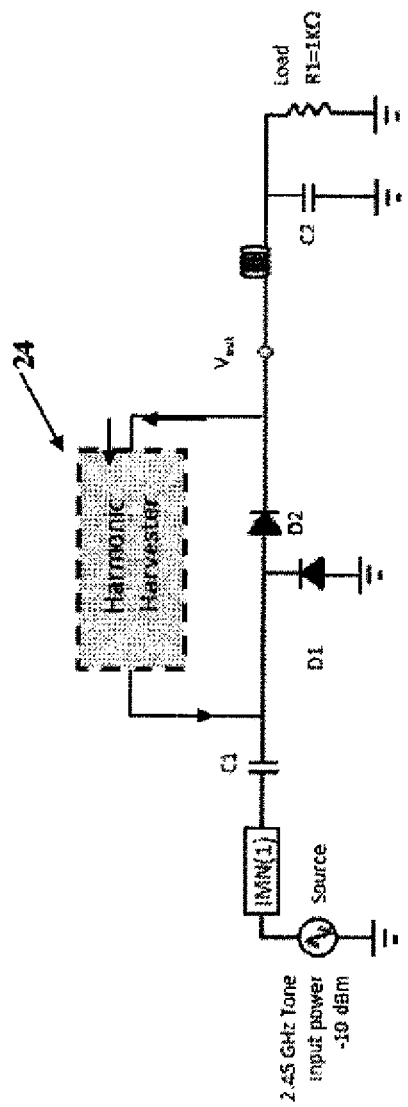
FIG. 8 shows an exemplary embodiment of the present invention connecting a single or multiple harmonic harvesters in a loop-back configuration.
Figure 11:
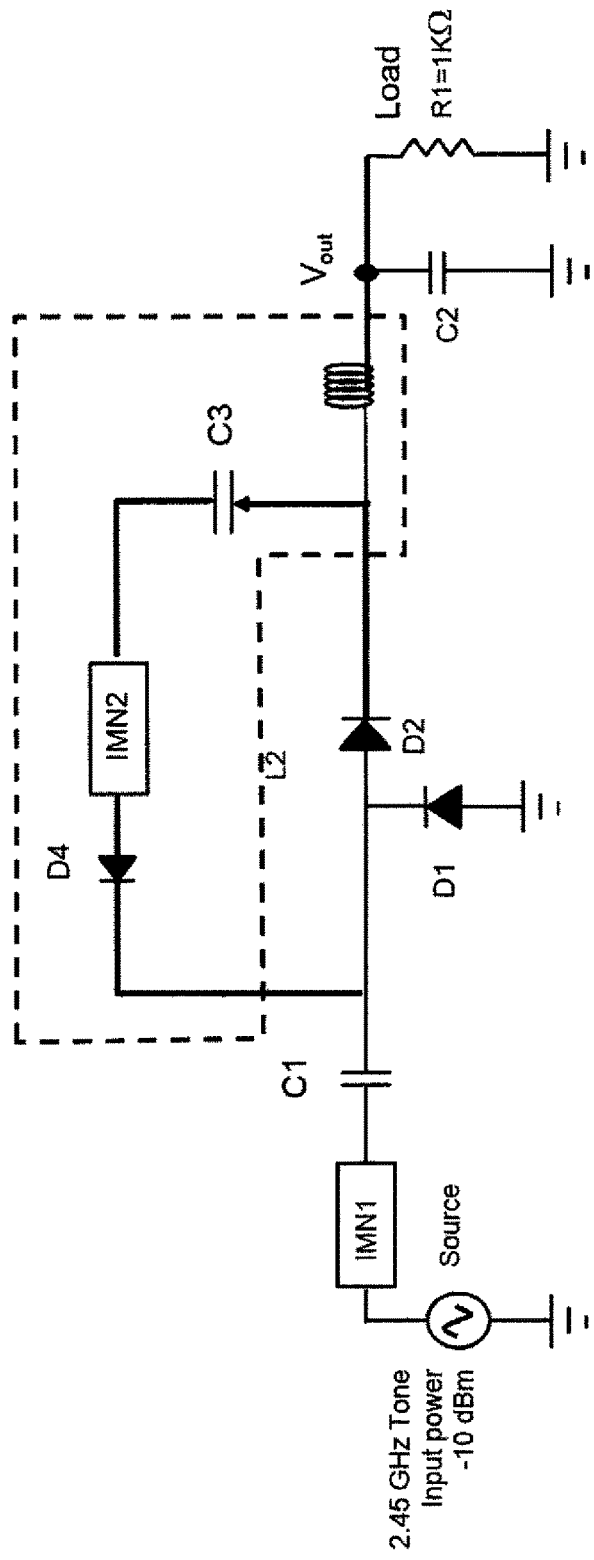
FIG. 11 shows an example circuit embodiment of FIG. 8.

FIG. 8 shows an exemplary embodiment the present invention of connecting a single, or multiple harmonic harvesters, in a loop-back 24 configuration. This configuration is equivalent to the multiple harmonic harvester embodiment without using multiple circuits, thus saving size and cost compared to the series configuration shown in FIG. 7. The dotted line around the harmonic harvester portion of the circuit in FIG. 8 is a general representation that the harvester circuits of the present invention (e.g., harvester circuits of FIGS. 3, 7) can be used as a feedback loop in FIG. 8 (for example, use of the harvester circuits of FIGS. 3 and 7 as a feedback loop requires taking the loop back to the input of the rectifier D2). FIG. 11 illustrates one example embodiment of the feedback loop circuit of FIG. 8.

Figure 9A:
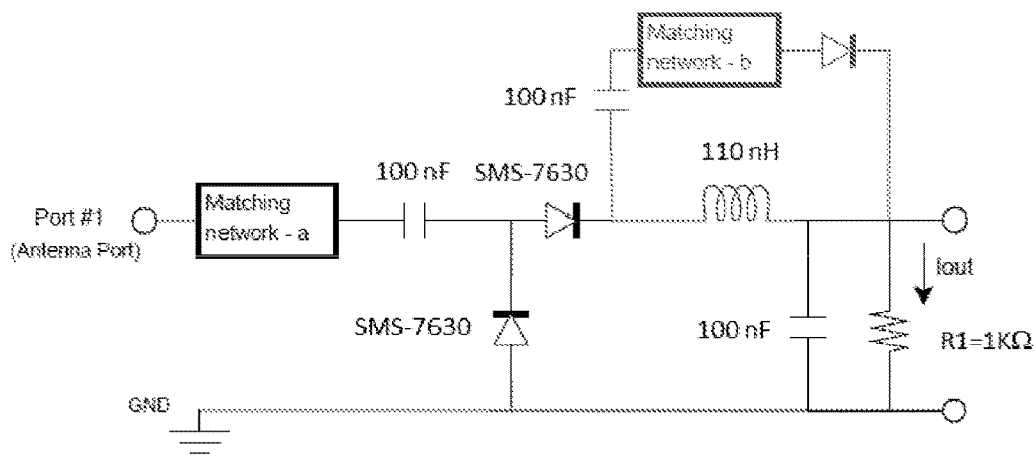
FIG. 9(a) shows an exemplary circuit implementing the single harmonic harvester design based on the FIG. 3 design.
Figure 9B:
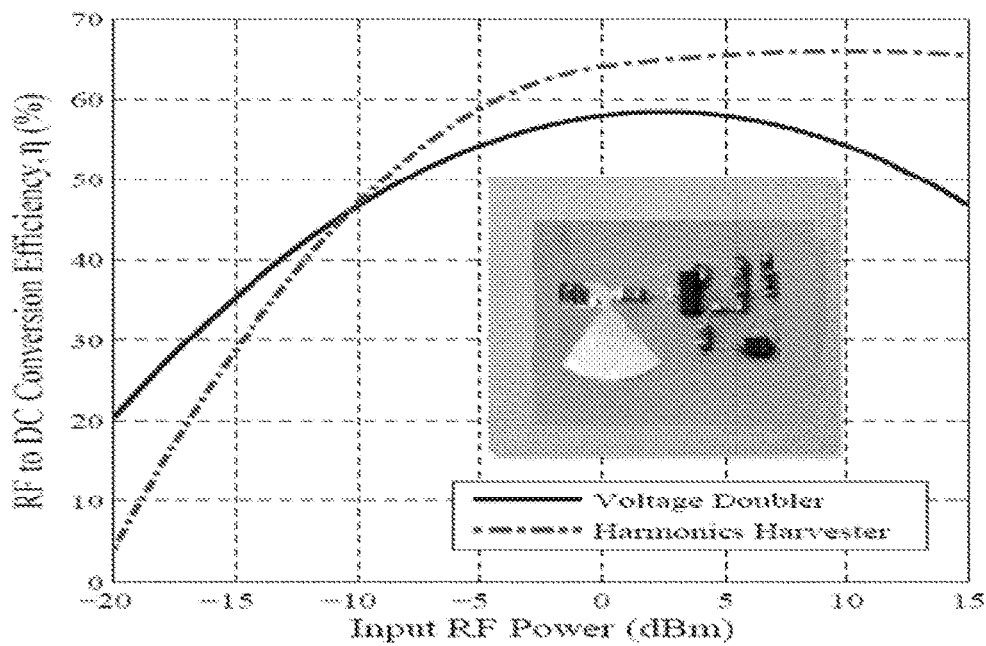
FIG. 9(b) shows the fabricated circuit board the measured conversion efficiency (dashed line) as a function of input power in comparison with the measured conversion efficiency (solid line) without the harmonic harvester.

FIG. 9(a) shows an exemplary circuit implementing the single harmonic harvester design (based on the FIG. 3 design). FIG. 9(b) shows the fabricated circuit board and the measured conversion efficiency (dashed line) as a function of input power in comparison with the measured conversion efficiency (solid line) without the harmonic harvester. In this case, the harmonic harvest increases the conversion efficiency by 5% to 18% for input power above −5 dBm.

Figure 10:
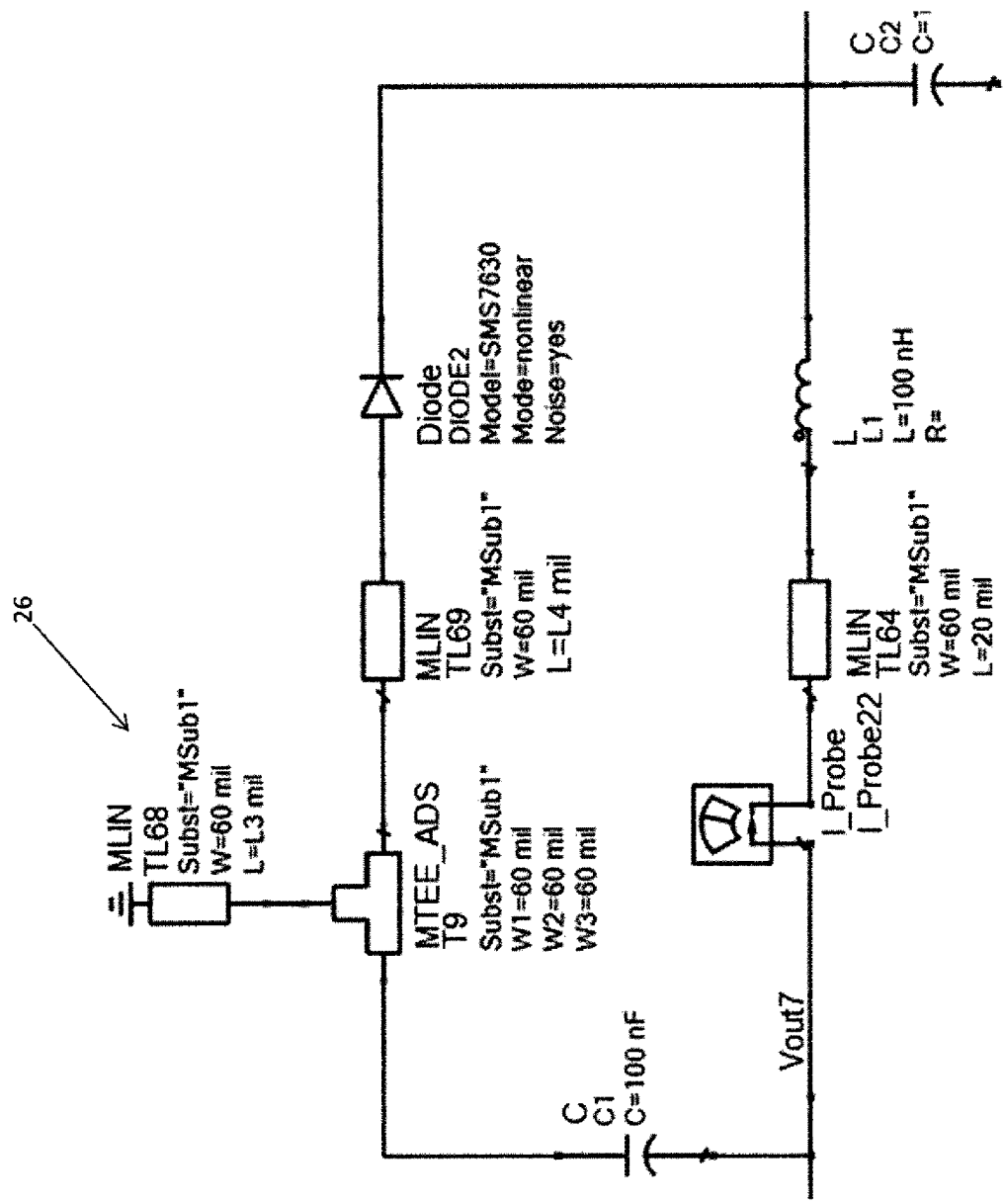
FIG. 10 shows an example of an ADS circuit model implementation of a harmonic harvester circuit.

FIG. 10 shows an example of an ADS circuit model implementation of a harmonic harvester circuit. The impedance matching network IMN portion 26 of the circuit is comprised of a section of transmission line TL69 and tee junction T9, and a shorted stub TL68. During the design optimization, the ADS will search automatically for the best lengths of TL69 and TL68 that produce maximum DC output.

While certain embodiments of the present invention are described in detail above, the scope of the invention is not to be considered limited by such disclosure, and modifications are possible without departing from the spirit of the invention as evidenced by the following claims:

What is claimed is:
1. An electrical circuit comprising:
A direct-current (DC) blocking circuit in communication with an output of an alternating-current-to-direct-current (AC-to-DC) converter circuit configured to provide DC signals and un-converted AC signals, the DC blocking circuit comprising an input and an output and configured to pass the un-converted AC signals and block the DC signals;

an impedance matching circuit comprising an input and an output and configured to receive the un-converted AC signals, wherein the input of the impedance matching circuit is in communication with the output of the DC blocking circuit;

a rectifying circuit comprising an input and an output, wherein the input of the rectifying circuit is in communication with the output of the impedance matching circuit; and an AC blocking circuit comprising an input and an output and configured to pass the DC signals and block the un-converted AC signals, wherein the input of the AC blocking circuit is in communication with both the output of the AC-to-DC converter circuit and the input of the DC blocking circuit.

2. The electrical circuit of claim 1, wherein the AC-to-DC converter circuit is a rectifier circuit and wherein the un-converted AC signals are un-rectified AC signals.

3. The electrical circuit of claim 1, wherein the output of the AC blocking circuit is in communication with the output of the rectifying circuit, and wherein the output of the AC blocking circuit and the output of the rectifying circuit form an output of the electrical circuit.

4. The electrical circuit of claim 1, wherein the un-converted AC signals are harmonic signals having frequencies that are multiples of a fundamental frequency.

5. The electrical circuit of claim 1, wherein one of the un-converted AC signals is a radio-frequency (RF) signal leaked to the output of the AC-to-DC converter circuit.

6. The electrical circuit of claim 1, wherein the DC blocking circuit is a capacitor.

7. The electrical circuit of claim 1, wherein the DC blocking circuit is a high-pass filter.

8. The electrical circuit of claim 1, wherein the AC blocking circuit is an inductor.

9. The electrical circuit of claim 1, wherein the AC blocking circuit is a low-pass filter.

10. The electrical circuit of claim 1, wherein the AC-to-DC converter circuit is a rectifier circuit.

11. The electrical circuit of claim 1, wherein the AC blocking circuit is configured to block fundamental and harmonic signals of an unconverted AC signal from being shorted to ground.

12. A circuit comprising a first electronic circuit and a second electrical circuit arranges in series and respectively comprising an electrical circuit of claim 1, wherein the first and second electrical circuits are configured to harvest un-converted alternating-current (AC) signals at an output of an AC-to-direct-current (AC-to-DC) converter circuit.

13. An electrical circuit comprising:
a direct-current (DC) blocking circuit in communication with an output of a first alternating-current-to-direct-current (AC-to-DC) converter circuit configured to provide DC signals and un-converted AC signals, the DC blocking circuit comprising an input and an output and configured to pass the un-converted AC signals and block the DC signals;

an impedance matching circuit comprising an input and an output, wherein the input of the impedance matching circuit is in communication with the output of the DC blocking and is configured to receive the un-converted AC signals circuit;

a second AC-to-DC converter circuit comprising an input and an output, wherein the input of the second AC-to-DC converter circuit is in communication with the output of the impedance matching electrical circuit and is configured to receive the un-converted AC signals; and an AC blocking circuit comprising an input and an output, wherein the input of the AC blocking circuit is in communication with the output of the first AC-to-DC converter circuit and is configured to pass the DC signals and block the unconverted AC signals.

14. The electrical circuit of claim 13, wherein the first and second AC-to-DC converter circuits are rectifier circuits and wherein the un-converted AC signals are un-rectified AC signals.

15. The electrical circuit of claim 13, wherein the output of the AC blocking circuit is in communication with the output of the second AC-to-DC converter circuit, and wherein the output of the AC blocking circuit and the output of the second AC-to-DC converter circuit form an output of the electrical circuit.

16. The electrical circuit of claim 13, wherein the AC blocking circuit is configured to block fundamental and harmonic signals associated with an unconverted AC signal from being shorted to ground.

17. The electrical circuit of claim 13, further comprising a second electrical circuit configured to harvest the un-converted AC signals in series with the electrical circuit.

18. The electrical circuit of claim 13, wherein the second AC-to-DC converter circuit is configured to convert fundamental and harmonic signals corresponding to the un-converted AC signals to DC signals.

19. The electrical circuit of claim 13, wherein the impedance matching circuit is configured to produce maximum DC output.

20. An electrical circuit comprising:
a direct-current (DC) blocking circuit in communication with an output of a first alternating-current-to-direct-current (AC-to-DC) circuit, the DC blocking circuit comprising an input and an output;

an impedance matching circuit comprising an input and an output, wherein the input of the impedance matching circuit is in communication with the output of the DC blocking circuit;

a second AC-to-DC converter circuit comprising an input and an output, wherein the input of the second AC-to-DC converter circuit is in communication with the output of the impedance matching circuit; and wherein the output of the second AC-to-DC converter circuit feeds into an input of the first AC-to-DC converter circuit to form a feedback loop.

21. The electrical circuit of claim 20, further comprising:
an AC blocking circuit comprising an input and an output, wherein the input of the AC blocking circuit is in communication with the output of the first AC-to-DC converter circuit.

22. The electrical circuit of claim 20, wherein the first and second AC-to-DC converter circuits are rectifier circuits.

23. The electrical circuit of claim 20, wherein the second AC-to-DC converter circuit is configured to convert fundamental and harmonic signals to DC signals.

* * * * *